(12) United States Patent
Graham et al.

(10) Patent No.: US 8,973,227 B2
(45) Date of Patent: Mar. 10, 2015

(54) PROCESS OF FITTING A COLLAPSIBLE CLIP TO A SLEEVE OF A PIEZOELECTRIC ACTUATOR

(75) Inventors: Karl W Graham, Ballymena (GB); Guy C. Sandford, Battle (GB)

(73) Assignee: Delphi International Operations Luxembourg, S.A.R.L., Luxembourg (LU)

( * ) Notice: Subject to any disclaimer, the term of this patent is extended or adjusted under 35 U.S.C. 154(b) by 1639 days.

(21) Appl. No.: 12/157,859

(22) Filed: Jun. 13, 2008

(65) Prior Publication Data

US 2008/0307616 A1    Dec. 18, 2008

(30) Foreign Application Priority Data

Jun. 15, 2007    (GB) .................................... 0711557.9

(51) Int. Cl.
  *F16L 33/03*    (2006.01)
  *H01L 41/25*    (2013.01)
(52) U.S. Cl.
  CPC ...................................... *F16L 33/03* (2013.01)
  USPC .............. 29/25.35; 29/507; 29/508; 310/311; 310/369
(58) Field of Classification Search
  USPC ......... 29/25.35, 595, 507, 508, 594; 310/311, 310/328, 340, 369; 411/34, 38
  See application file for complete search history.

(56) References Cited

U.S. PATENT DOCUMENTS 7,687,970 B2    3/2010    Bosch et al.
2007/0103030 A1*    5/2007    Bosch et al. .................. 310/311

FOREIGN PATENT DOCUMENTS

| DE | 195 33 553 | | 3/1997 | |
| DE | 100 61 425 | | 6/2002 | |
| EP | 0 131 874 | | 1/1985 | |
| EP | 1 783 842 | | 5/2007 | |
| JP | 04106407 A | * | 4/1992 | ............... 29/25.35 X |

OTHER PUBLICATIONS

Machine Translation (in English) of DE 195 33 553, Aug. 2014.*
European Search Report dated Jun. 10, 2010.

* cited by examiner

*Primary Examiner* — A. Dexter Tugbang
(74) *Attorney, Agent, or Firm* — Mark H. Svoboda

(57) ABSTRACT

A tubular clip for securing a sleeve to the body of a piezoelectric actuator in an actuator assembly. In use, the wall of the clip has a plurality of corrugations. The pitch of the corrugations is variable in the direction of the longitudinal axis of the clip. The clip is configurable into an unfitted configuration and into a fitted configuration and in the fitted configuration the minimum transverse internal separation of the clip walls is less than in the unfitted configuration.

4 Claims, 3 Drawing Sheets

PROCESS OF FITTING A COLLAPSIBLE CLIP TO A SLEEVE OF A PIEZOELECTRIC ACTUATOR

TECHNICAL FIELD

The present invention relates to a clip for sealing the ends of a sleeve located around a piezo-electric actuator to the body of that piezo-electric actuator. In particular, the present invention relates to a collapsible clip having an internal dimension which decreases when the clip is axially collapsed.

BACKGROUND OF THE INVENTION

In a fuel injector the piezo-electric actuator may be located in an accumulator volume which receives high pressure fuel. It is essential to prevent contact between the fuel and the actuator to prevent the actuator from suffering damage. To prevent such damage it is known to provide a sleeve around the actuator. This sleeve must be sealed to the actuator at each end to prevent the ingress of fuel and any contaminants that it may contain.

SUMMARY OF THE INVENTION

According to a first aspect the present invention provides a tubular clip for securing a sleeve to the body of a piezo-electric actuator in an actuator assembly, wherein, in use, the wall of the clip has a plurality of corrugations, with a pitch variable in the direction of the longitudinal axis of the clip, and the clip is configurable into an unfitted configuration and into a fitted configuration and in the fitted configuration the minimum transverse internal separation of the clip walls is less than in the unfitted configuration.

Preferably, the clip has a circular cross-section. This is advantageous because the distribution of stress and force is mathematically uniform in the radial plane and thus provides a continuous and uniform radial sealing force where the corrugations are in contact with the sleeve. However, the band may be of any shape that is necessary to complement the external profile of the actuator body. For example, the band may be hexagonal.

Preferably, the corrugations have a sinusoidal cross-sectional profile. This produces a preferred stress distribution within the clip because there are no stress raisers. In addition, the smooth peaks of the clip are less likely to induce a tear in the material of the sleeve. However, the cross-sectional profile of the corrugations may be of any form that facilitates collapsibility and efficient sealing, for example, the corrugations may have a triangular, sawtooth profile.

Preferably, the clip is made from spring steel. This is advantageous because of the large elastic range of this material. Alternatively, the clip may be made from a shape memory alloy. This is advantageous because of the increased elastic range of this family of materials.

According to a second aspect the present invention provides a method of fitting a clip to secure a sleeve to the body of a piezo-electric actuator in an actuator assembly, comprising the steps of applying a force to the clip when it is in the fitted configuration, the force elastically axially extending the clip from the fitted configuration to the unfitted configuration, fitting the clip over the sleeve surrounding the actuator, and removing the force from the clip so that it elastically reverts towards the fitted configuration, wherein the corrugations on the clip form a plurality of continuous ring seals around the sleeve and the body of the actuator, wherein the corrugations on the clip form a plurality of continuous ring seals around the sleeve and the body of the actuator.

According to a third aspect the present invention provides a further method of fitting a clip to secure a sleeve to the body of a piezo-electric actuator in an actuator assembly, comprising the steps of, fitting the clip in the unfitted configuration over the sleeve surrounding the actuator, applying a force to the clip when it is in the unfitted configuration, the force plastically axially crushing the clip from the unfitted configuration to the fitted configuration, and removing the force from the clip, wherein the corrugations on the clip form a plurality of continuous ring seals around the sleeve and the body of the actuator.

BRIEF DESCRIPTION OF THE DRAWINGS

A preferred embodiment of the present invention will now be described with reference to the accompanying drawings in which.

DETAILED DESCRIPTION OF THE PREFERRED EMBODIMENT

Figure 1:
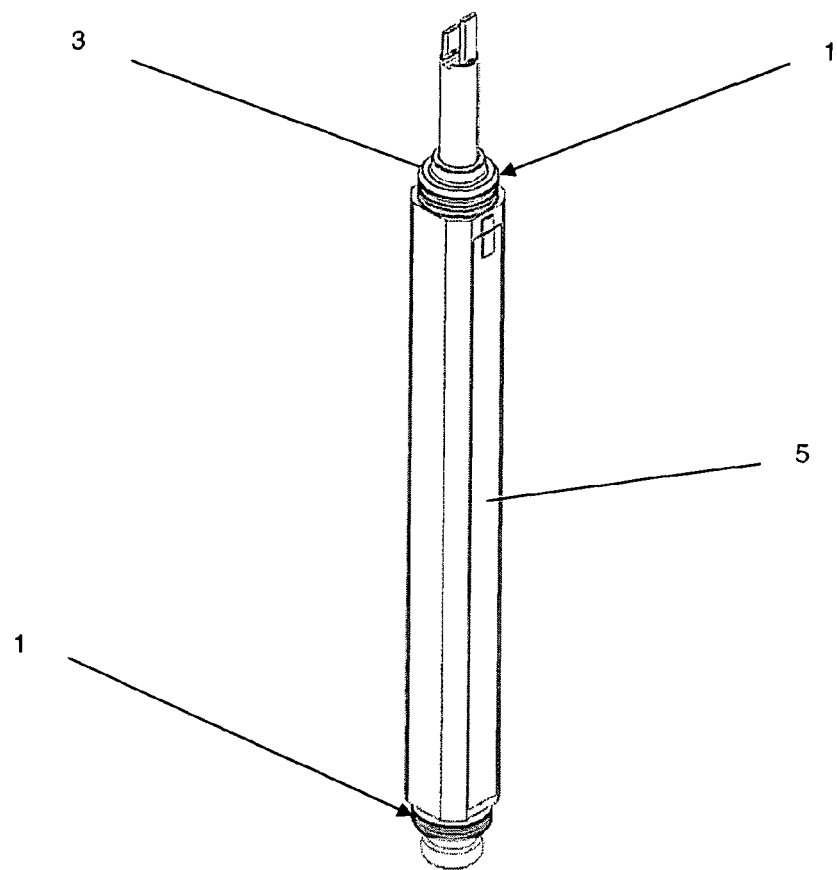
FIG. 1 is a perspective view of a piezo-electric actuator assembly provided with a protective sleeve which is sealed at either end to the body of the actuator by a collapsible clip according to the present invention.

FIG. 1 illustrates an application of a collapsible clip 1 according to the present invention to a piezo-electric actuator assembly. A clip 1 is located at each end of the body of an actuator 5, over a sleeve 3 surrounding the body of the actuator 5, in order to seal the actuator 5 within the sleeve 3.

Figure 2:
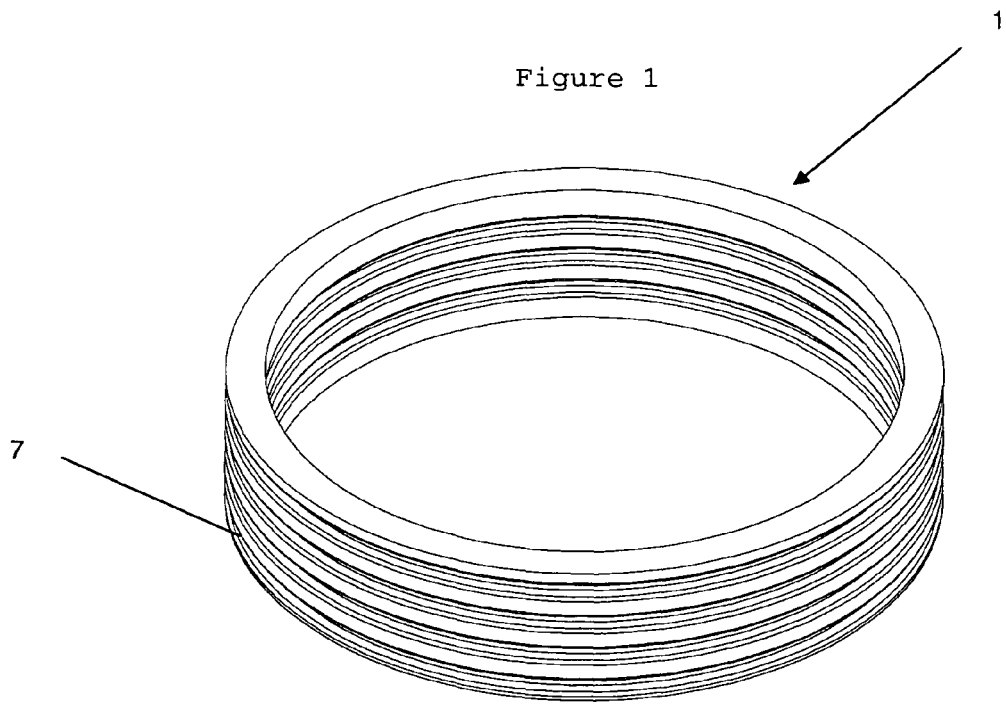
FIG. 2 is a perspective view of the collapsible clip of FIG. 1 in an axially collapsed state.
Figure 6:
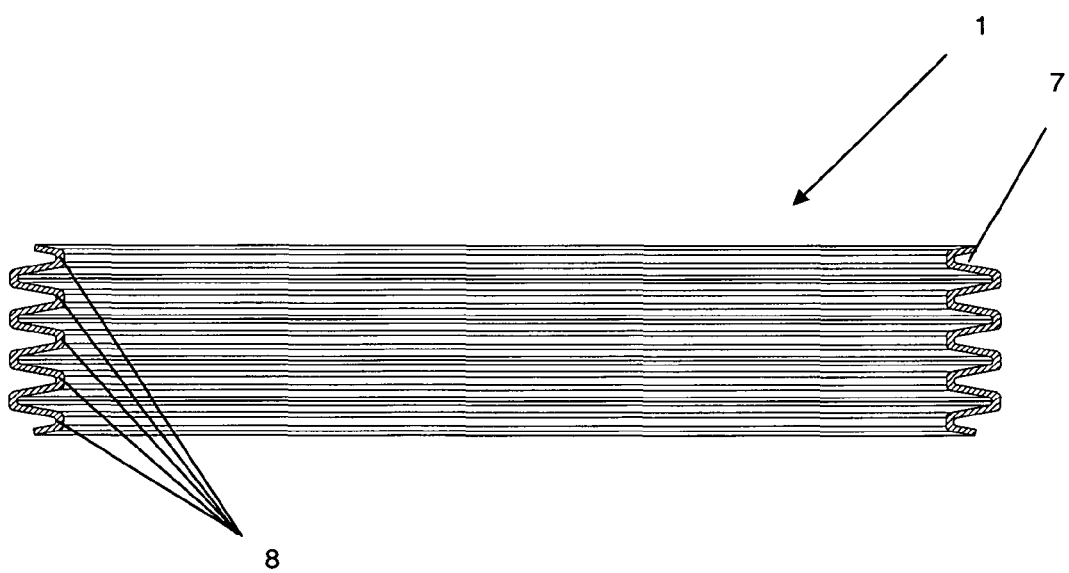
FIG. 6 is an elevation view of the collapsible clip of FIG. 1 in an axially collapsed state

FIGS. 2 and 6 illustrate the clip 1 in an axially collapsed state. The clip 1 is in the form of a circular band and when the clip 1 is in an axially collapsed state the wall of the band is provided in an axial direction with a number of corrugations 7, having a sinusoidal cross-section profile in the radial direction, with internally facing peaks 8.

Figure 3:
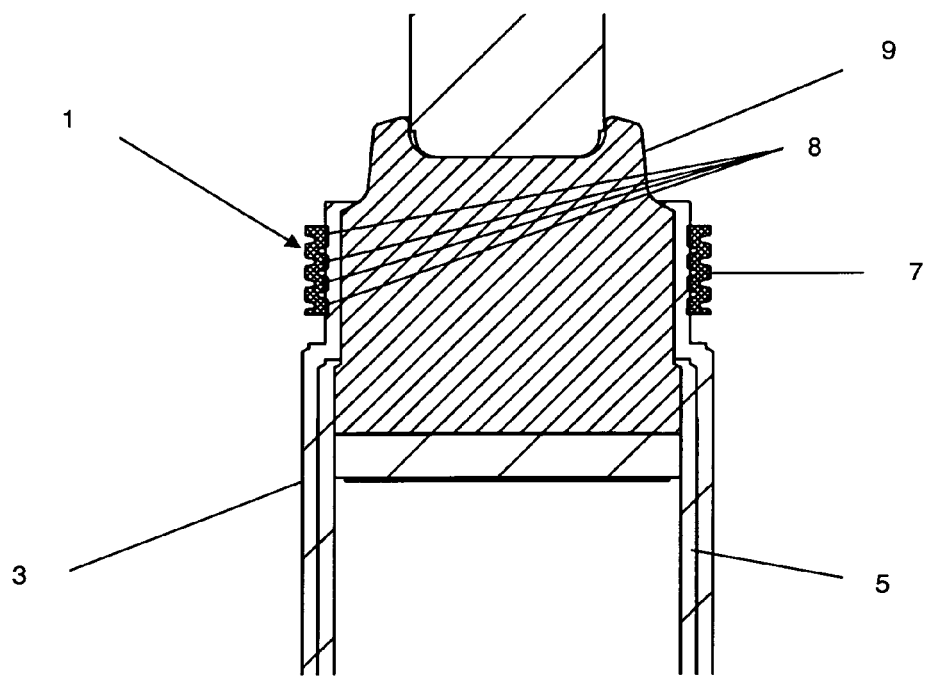
FIG. 3 is a cross-sectional view of the piezo-electric actuator assembly showing a collapsible clip according to the present invention sealing the protective sleeve to a first end of the actuator body.
Figure 4:
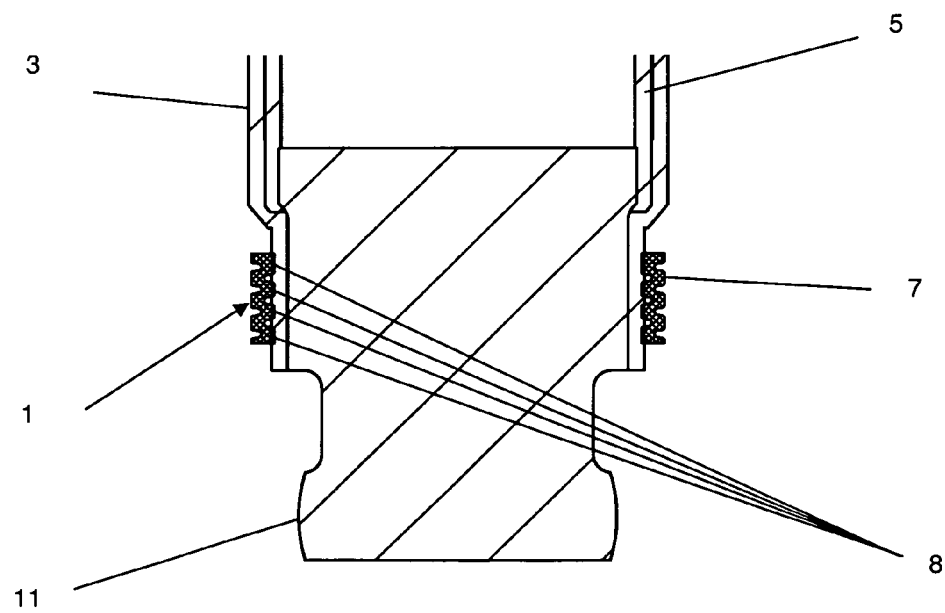
FIG. 4 is a cross-sectional view of the piezo-electric actuator assembly showing a collapsible clip according to the present invention sealing the protective sleeve to a second end of the actuator body.

As shown in FIGS. 3 and 4, when the clip 1 is applied to a piezo-electric actuator assembly the internally facing peak 8 of each corrugation contacts the protective sleeve 3 and forms a continuous ring seal between the sleeve 3 and the respective ends 9, 11 of the body of the actuator 5. The ends 9, 11 have a circular cross-sectional profile so that an effective seal can be created by the circular clip 1.

Figure 5:
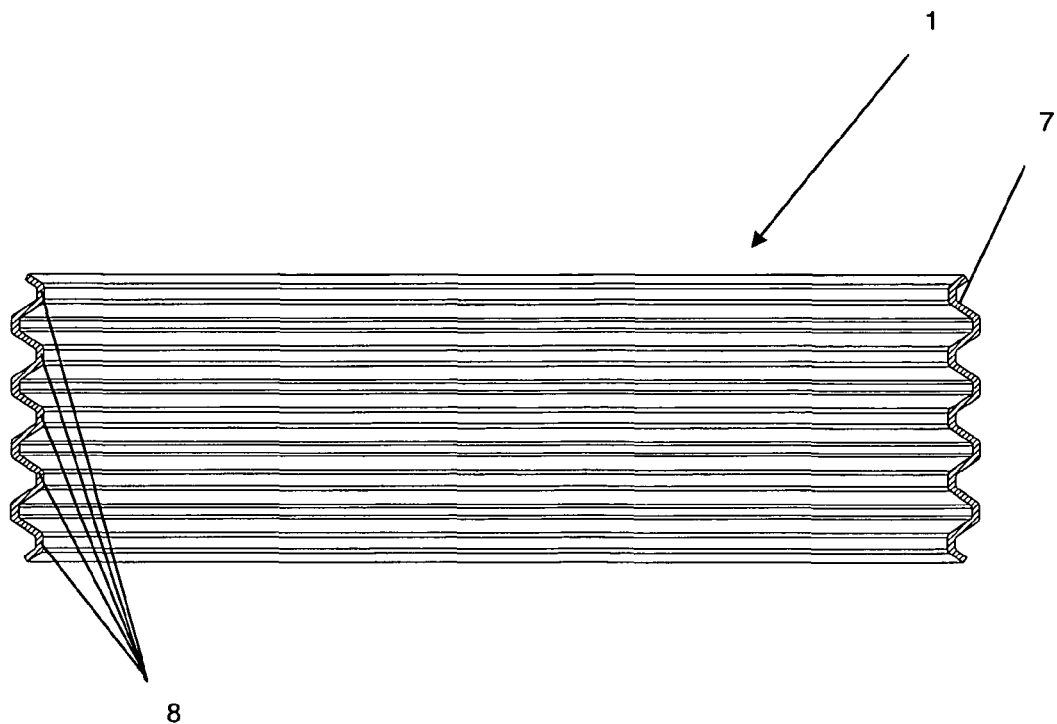
FIG. 5 is an elevation view of the collapsible clip of FIG. 1 in an axially extended state.

FIG. 5 shows the clip 1 in an axially extended state. In this state the depth or amplitude of the corrugations 7 is decreased and the internal diameter of the clip 1 is increased. The increase in the internal diameter of the clip 1 is proportional to the axial extension that the clip 1 is subjected to.

The increased internal diameter of the clip 1 in the axially extended state enables the clip 1 to be fitted over the sleeve 3 surrounding the body of the actuator 5. Subsequent collapsing of the clip 1 into a collapsed state enables the ring seals to be formed between the clip 1, the sleeve 3 and the body of the actuator 5.

According to the present invention there are two preferred methods for transitioning the clip 1 from an extended state to a collapsed state.

In the first embodiment the relaxed state of the clip 1 is the collapsed state. In order to fit the clip 1 to the actuator assembly it is axially stretched. However, the material of the clip 1 remains within its elastic region. In axially stretching the clip 1 its internal diameter is increased such that it is larger than the external diameter of the sleeve 3, when the sleeve 3 is fitted over the ends 9,11 of the body of the actuator 5. The dimensions of the clip 1 and its corrugations 7 are chosen such that when the clip 1 is in its relaxed collapsed state the internal diameter of the clip is less than the external diameter of the sleeve 3, when the sleeve 3 is fitted over the ends 9,11 of the body of the actuator 5. Thus, when the clip 1 is fitted to the actuator assembly it cannot fully return to its relaxed collapsed state and consequently the peaks 8 of the corrugations apply a radial compressive force to the sleeve 3, in order to create the ring seals discussed above.

In the second embodiment the relaxed state of the clip 1 is the axially extended state. In the axially extended state the internal diameter of the clip 1 is larger than the external diameter of the sleeve 3, when the sleeve 3 is fitted over the body of the actuator 5, to enable the clip to be located in position. In order to clamp the clip 1 to the actuator assembly a force is applied to the clip 1 to axially crush it. In this embodiment the material of the clip 1 is plastically deformed. In crushing the clip 1 its internal diameter is decreased to a size which is smaller than the external diameter of the sleeve 3, when the sleeve 3 is fitted over the ends 9,11 of the body of the actuator 5, such that the ring seals discussed above can be created between the peaks 8 of the corrugations 7 and the sleeve 3. The dimensions of the clip 1 and its corrugations 7 are chosen such that even if there is some elastic recovery of the clip 1 when the crushing force is released, the inner diameter of the clip 1 does not become larger than the external diameter of the sleeve 3 when fitted over the ends 9,11 of the body of the actuator 5. This embodiment of the present invention may either use the material properties of the clip 1, or controlled buckling, to achieve the necessary plastic deformation.

In both the first and the second embodiments the dimensions of the clip 1 are also chosen such that there is sufficient elastic margin from the state of the clip 1 when it has been fitted that efficient ring seals can be maintained even if the clamped material, for example the material of the sleeve 3, should creep or otherwise change cross-sectional thickness.

The clip 1 may be manufactured as a single component. However, it may be advantageous, for example for manufacturing reasons, to manufacture the clip 1 as a number of parts, for assembly prior to fitting.

The invention claimed is:

1. A method of fitting a circumferentially continuous tubular clip for securing a sleeve to the body of a piezo-electric actuator in an actuator assembly, the clip comprising one or more walls that, in use, have a plurality of corrugations, the corrugations having a pitch that is variable in the direction of a longitudinal axis of the clip, wherein the clip is configurable into an unfitted configuration and into a fitted configuration, wherein, in the fitted configuration, the minimum transverse internal separation within the one or more walls is less than the minimum transverse internal separation within the one or more walls in the unfitted configuration, to secure a sleeve to the body of a piezo-electric actuator in an actuator assembly, the method comprising the steps of:

applying a force to the clip when said clip is in the fitted configuration, the force elastically axially lengthening the clip from the fitted configuration to an axially unfitted configuration, fitting the clip over the sleeve surrounding the piezo-electric actuator, and removing the force from the clip so that the clip reverts elastically toward the fitted configuration.

2. A method of fitting a clip to secure a sleeve to the body of a piezo-electric actuator in an actuator assembly, the clip having one or more walls having a circumferentially continuous tubular form, the one or more walls of the clip having a plurality of corrugations, the corrugations having a pitch that is variable in the direction of the longitudinal axis of the clip, the clip being configurable into an unfitted configuration and into a fitted configuration, wherein the minimum transverse internal separation of the one or more walls in the fitted configuration is less than the minimum transverse internal separation of the one or more walls in the unfitted configuration, the method comprising the steps of:

placing the clip in the unfitted configuration over the sleeve surrounding a portion of the piezo-electric actuator, and changing the pitch of the corrugations to configure the placed clip into the fitted configuration.

3. The method of claim 2, wherein the step of changing the pitch of the corrugations comprises applying a force to the clip when it is in the unfitted configuration, the force plastically, axially crushing the clip from the unfitted configuration to the fitted configuration.

4. A method of fitting a clip to secure a sleeve to the body of a piezo-electric actuator in an actuator assembly, the clip having one or more walls having a circumferentially continuous tubular form, the one or more walls of the clip having a plurality of corrugations, the corrugations having a pitch that is variable in the direction of the longitudinal axis of the clip, the clip being configurable into an unfitted configuration and into a fitted configuration, wherein the minimum transverse internal separation of the one or more walls in the fitted configuration is less than the minimum transverse internal separation of the one or more walls in the unfitted configuration, the method comprising the steps of:

placing the clip in the unfitted configuration over the sleeve surrounding a portion of the piezo-electric actuator, and changing the pitch of the corrugations to configure the placed clip into the fitted configuration, wherein the step of placing the clip is preceded by the step of applying a force to the clip when said clip is in the fitted configuration, the force elastically axially lengthening the clip from the fitted configuration to an axially lengthened unfitted configuration, and the step of changing the pitch of the corrugations comprises removing the force from the clip so that the clip reverts elastically toward the fitted configuration.

* * * * *